March 5, 1957
D. A. BRIDGES ET AL
2,783,837
PACKAGED INSULATING BATS AND METHOD
AND APPARATUS FOR MAKING THEM
Filed May 21, 1953
6 Sheets-Sheet 1
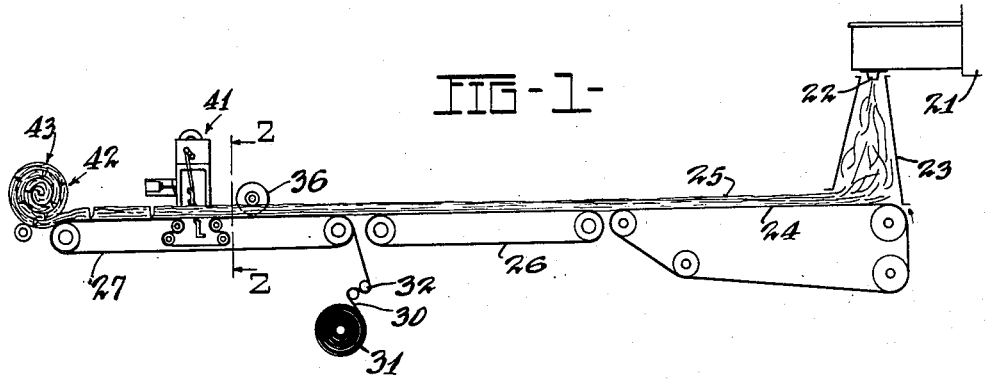
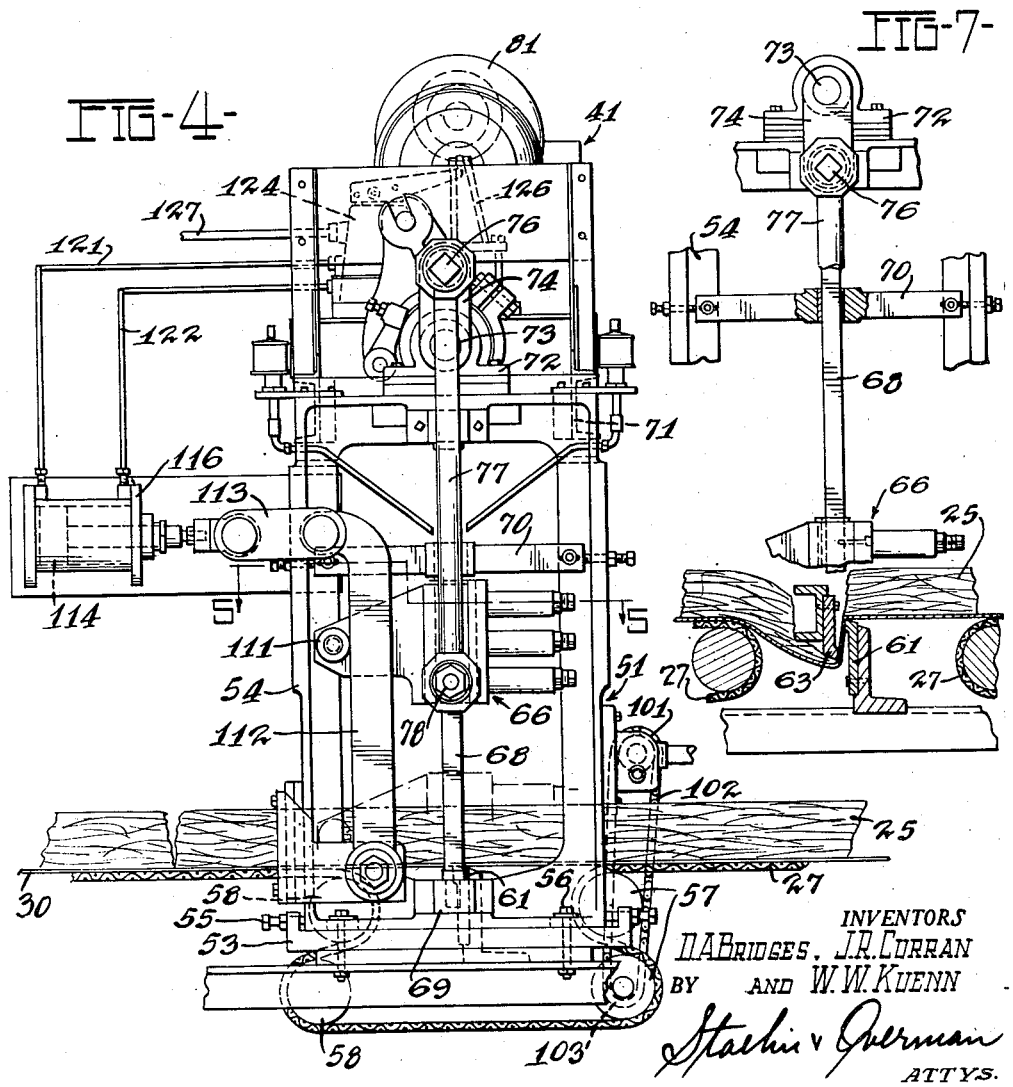
INVENTORS
D. A. BRIDGES, J. R. CURRAN
AND W. W. KUENN
BY
ATTYS.

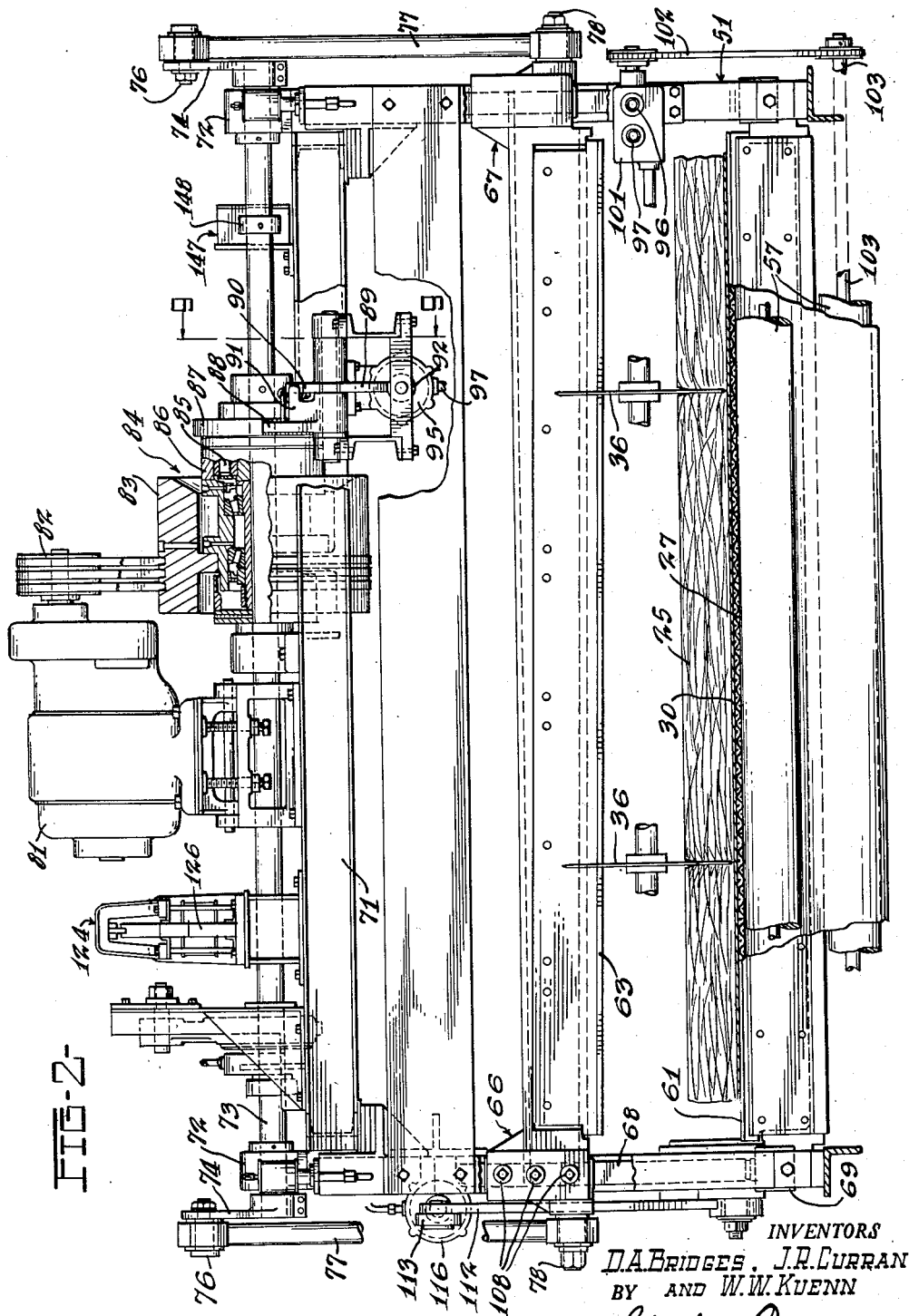

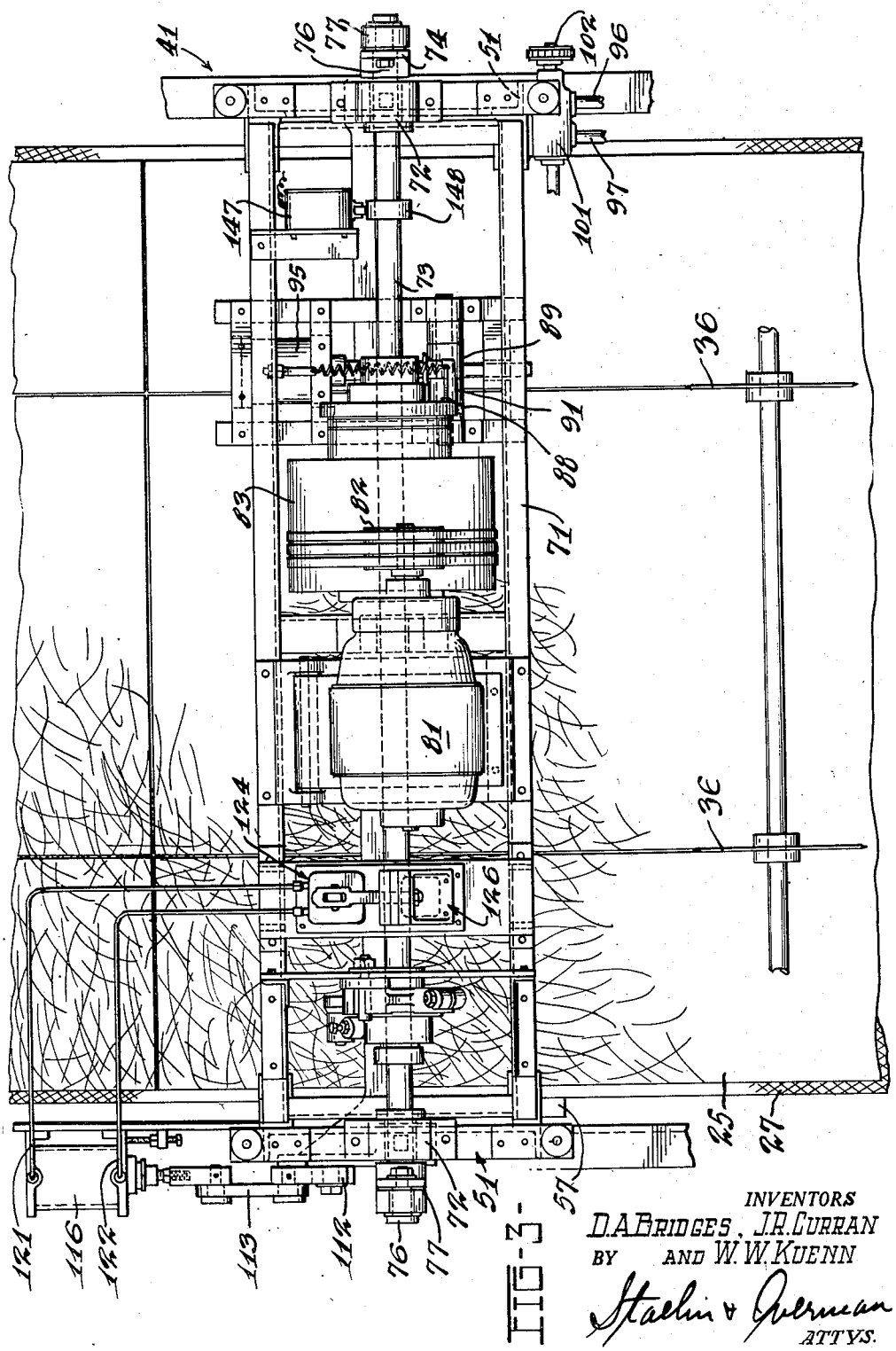

March 5, 1957
D. A. BRIDGES ET AL
2,783,837
PACKAGED INSULATING BATS AND METHOD
AND APPARATUS FOR MAKING THEM
Filed May 21, 1953
6 Sheets-Sheet 4
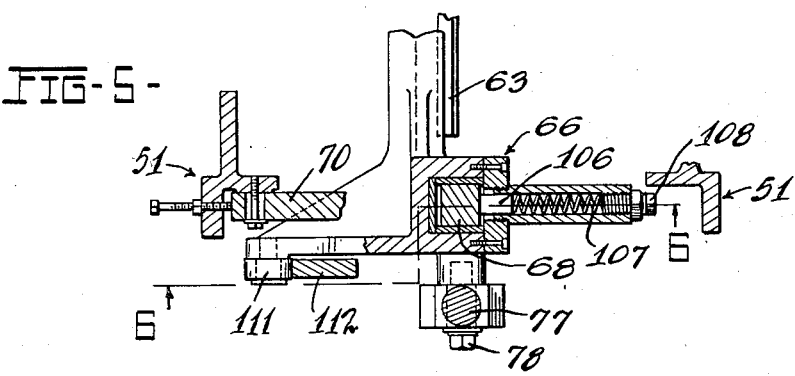
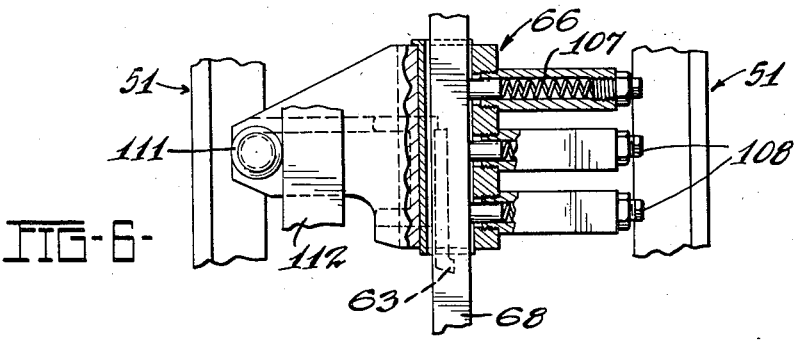
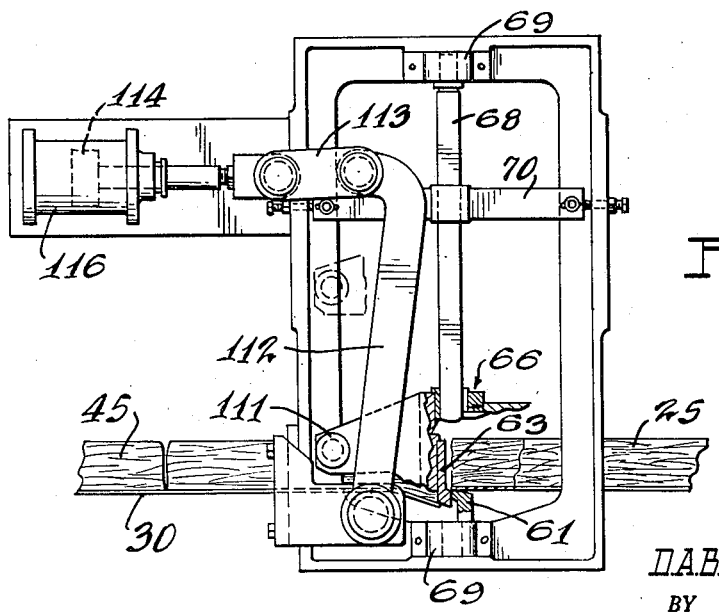
INVENTORS
D.A.BRIDGES, J.R.CURRAN
BY   AND   W.W.KUENN.
*Staehli & Guerman*
ATTYS.

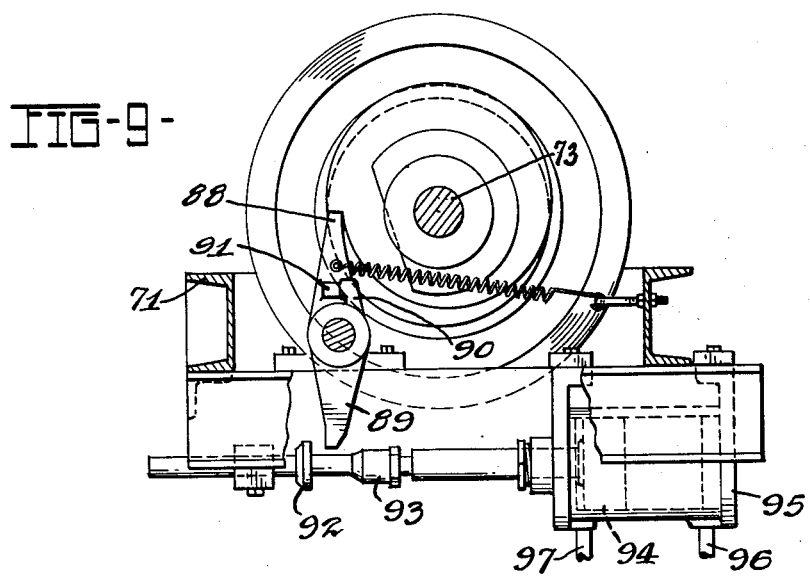
FIG-9-
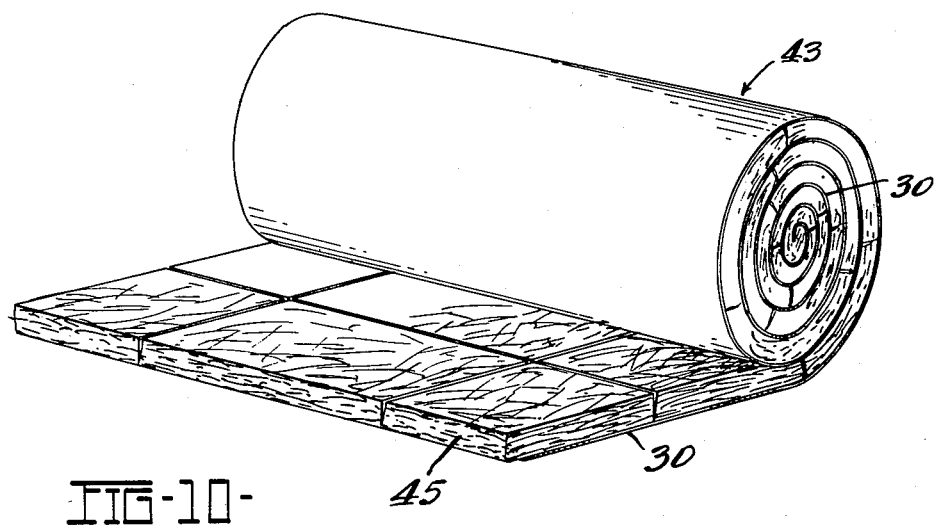
FIG-10-
INVENTORS
D.A.BRIDGES, J.R.CURRAN
BY AND W.W.KUENN.
ATTYS.

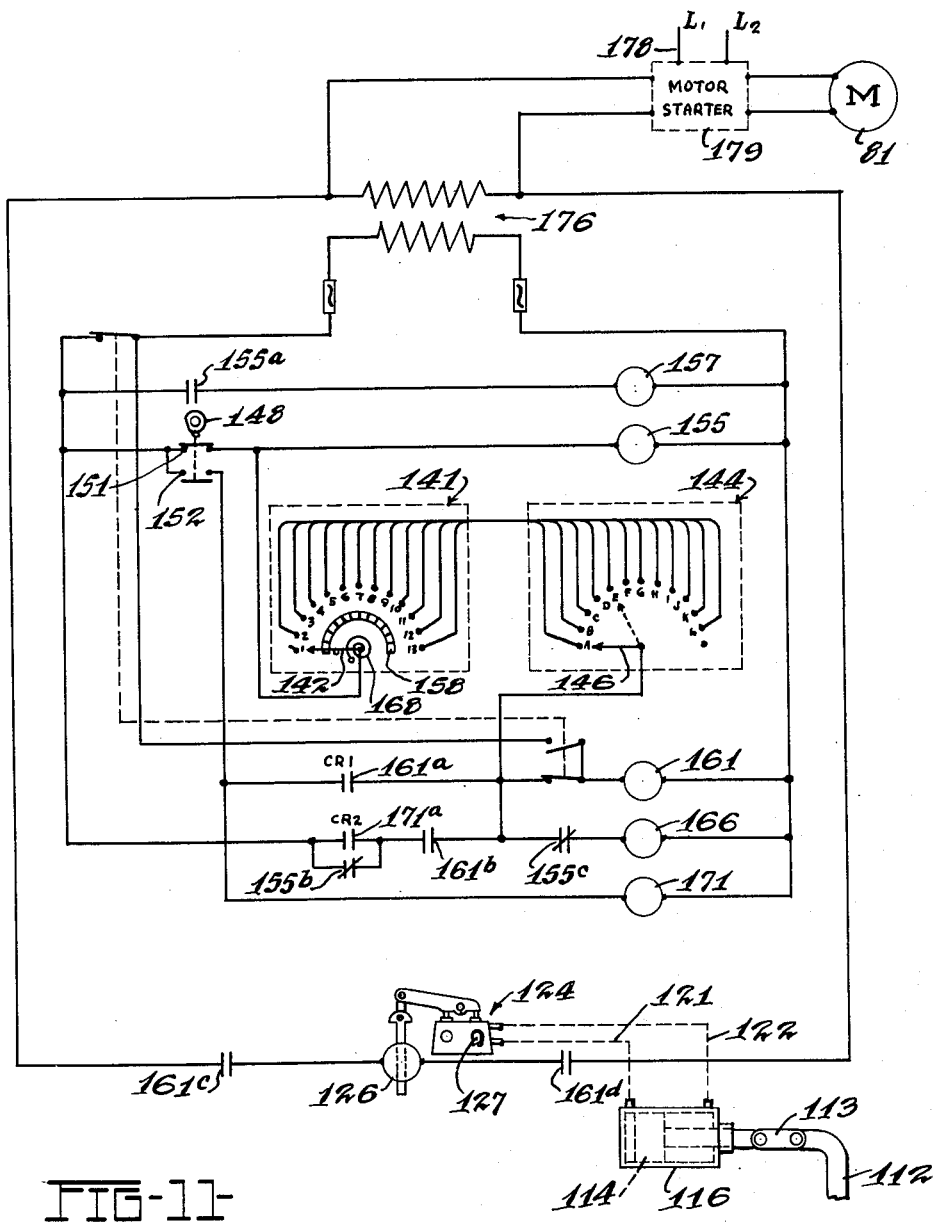

2,783,837
PACKAGED INSULATING BATS AND METHOD AND APPARATUS FOR MAKING THEM

Donald A. Bridges and John R. Curran, Newark, and William Whitney Kuenn, Toledo, Ohio, assignors to Owens-Corning Fiberglas Corporation, Toledo, Ohio, a corporation of Delaware Original application January 7, 1949, Serial No. 69,812. Divided and this application May 21, 1953, Serial No. 360,424

11 Claims. (Cl. 164—17)

This application is a division of Serial No. 69,812, filed Jan. 7, 1949, and now abandoned.

This invention relates to insulating bats and the process and apparatus for making them, and particularly to packaged fibrous bats such as those used for thermal and acoustic insulation and to the process and apparatus for making the packages of bats.

At the present time, insulating bats in the form of loose fluffy masses of mineral wool or other fibers are packaged for shipment in cartons or bags. The bats are most usually cut from an advancing continuous web of the fibers on a conveyor and as the bats are cut from the mat they are stacked in the carton or stacked and the stack slipped into a bag.

This method of packaging the smaller bats by putting them in cartons or bags consumes considerable time. Additionally the cartons and bags are expensive and the packages are bulky and wasteful of space in transportation and storage. Blankets or long mats of insulating material have been satisfactorily packaged by being rolled on themselves and wrapped with paper. However, it was not possible to roll a number of bats, that is, pieces of say one to ten feet in length, and wrap them with paper because it was impossible practically to combine a large number of short pieces into a roll.

It is an object of the present invention to provide an improved package of insulating bats.

It is a further object of the invention to provide a simple and economical package that is convenient to use and from which the individual bats may be removed one at a time as required.

Further objects of the invention are to provide packages of insulating bats that reduce the handling necessary in making up the package and later in removing the bats from the package, that conserve paper and cartons used in packaging the bats, and that are exceptionally compact, with consequent saving of space in storing and shipping.

It is a further object of the invention to provide a simple and efficient process and apparatus for making packages of insulating bats, and by which the handling of the bats during packaging is greatly reduced.

It is still another object of the invention to provide apparatus for making packages of insulating bats that will operate rapidly to form bats of the proper size and place them in the proper relation in the package.

It is a still further object of the invention to provide an apparatus that may be set quickly to make packages of different sizes having therein different numbers of bats and bats of different sizes.

Other objects of the invention will be apparent from the following description and claims, and from the drawings, in which:

Figure 1 is a schematic elevational view of a manufacturing line for making insulating bats;

Figure 2 is a cross-sectional view of the line at the station at which the mat of insulating material is cut into bats, and taken on the line 2—2 of Figure 1;

Figure 3 is a plan view of the mechanism shown in Figure 2;

Figure 4 is an end elevational view of the same;

Figure 5 is a horizontal sectional view of the same taken on the line 5—5 of Figure 4;

Figure 6 is a vertical sectional detail view taken in the plane of the line 6—6 of Figure 5;

Figure 7 is a view similar to Figure 4 but with parts broken away and partly in section and showing the movable cutting knife in its lower position and in one of its lateral relations to the stationary knife;

Figure 8 is a view similar to Figure 4 but showing another lateral relation between the movable and the stationary cutting knives;

Figure 9 is a vertical sectional detail view taken on the line 9—9 of Figure 2;

Figure 10 is a perspective view of the package of the present invention; and

Figure 11 is a diagram of the electrical connections of the present invention.

In the manufacture of bats of comminuted or fibrous material such as shredded wood fiber, cotton fibers, mineral wool such as rock, slag or glass wool, shredded paper, and the like, the fiber or other constituent material is first combined into a continuous mat usually by being blown or otherwise deposited upon a conveyor. The mat of material is then cut into bats of the desired size, usually by slitting the mat into two or more strips and then cutting the strips crosswise to form the bats. The bats may be from one to four feet or more in width and from one or two up to eight or ten feet in length. These bats are then packaged for shipment.

In describing the present invention, particular reference will be made to the manufacture of bats of fibrous glass although it is to be understood that the invention is applicable to the manufacture of bats of other materials. In the manufacture of glass fiber bats, the fibers are usually formed by flowing molten glass from the forehearth of a glass melting furnace represented at 21 and by means of suitable blowers 22 the streams of molten glass are attenuated into fibers as they pass through a conduit 23 which ends at a conveyor 24 upon which the fibrous material is deposited to form a mat 25. The mat 25 is transferred to a second conveyor 26 and then to a third conveyor 27, all arranged end-to-end to advance the mat continuously in the general direction of its length. At the end of the second conveyor 26 a continuous web 30 of sheet material is fed onto the underside of the mat. The sheet material is most commonly paper such as kraft paper but may be any other material, such as muslin. The web may be of a width corresponding approximately to the width of the mat or it may be enough wider than the mat to be doubled over the edge of the mat when the mat is packaged.

The web 30 of sheet material is taken from a supply roll 31 and, if desired, over feeding rolls 32 and then onto the upper flight of the conveyor 27 so that the mat as it passes onto the conveyor 27 from the conveyor 26 is backed by a continuous sheet of paper or the like.

The mat of fibrous material on the conveyor 27 may be slit into two or more strips that in turn are cut into bats of the desired size. To slit the mat there may be one or more rotary saws or knives 36 disposed above the conveyor and spaced apart desired distances crosswise of the conveyor. These knives are driven in any suitable manner and may be set to cut through the mat but not through the backing sheet, or may be set to cut through both. In rear of the knives 36 in the direction of travel of the mat there is a station 41 at which the mat is cut crosswise into pieces of the desired length to form the finished bats. The bats with the backing paper are then rolled as indicated at 42 to form a package 43. This rolling may be accomplished mechanically or by hand as desired.

At the station 41 the mat is cut without severing the backing paper a number of times and until the number of bats selected to form a package have been cut. At the time that the last bat of the selected number is cut, the paper is also severed and the resulting length of backing paper corresponds to the aggregate length of the bats combined into a single roll package.

The roll package 43 is illustrated in Figure 10 and is shown partially unrolled to better illustrate the bats in the package. The package contains a number of individual bats 45 which, in the present instance, are shown in sets of three, one of the bats in the set being of a different width. This type of variety of sizes of bats is desired for the insulation of appliances such as stoves and refrigerators, where the insulation must often be in two or more pieces of different sizes. The sets of insulating bats are shown arranged end-to-end on the backing paper and the bats and paper are rolled tightly into a compact package. This rolling is made possible by the continuous backing sheet, without which it would be very difficult if not impossible to gather the large number of bats into a compact roll. The package is held in compactly rolled relation by gummed tape or other conventional means.

While the roll shown in Figure 10 is made up of different sizes of insulating bats, it can as well be made up of one size, with the bats arranged side-by-side in sets or arranged in a single file end-to-end, which latter arrangement is made possible in any case merely by slitting the paper at the time the mat is slit.

One form of apparatus that may be used in performing the process of this invention is illustrated in detail in Figures 2 to 9 of the drawings. It includes end frames 51 located at opposite sides of the conveyor 27 so that the mat of fibrous material passes between them. Each end frame is made up of a stationary base 53 and a movable upper part 54 that by means of set bolts 55 is adjustable forwardly and rearwardly, with respect to the direction of travel of the conveyor 27, and that may be fastened in adjusted position by bolts 56.

Extending across the space between the end frames is a pair of rollers 57 at the forward side of the cutting station and a similar pair of rollers 58 at the rear side of the station. The conveyor 27 passes over the upper roller of the pair 57 at the forward side of the cutting station, then down around the lower roller of this pair, across the cutting station, and then in similar fashion up and over the rollers of the pair 58 at the rearward side of the station.

A lower stationary cutting knife 61 extends across the space between the end frames and is mounted on the stationary bases 53 of the end frames so as to extend across the path of travel of the fibrous mat with the upper edge of the knife substantially in the plane of the lower surface of the mat (Figure 7). An upper movable knife 63 is mounted for vertical reciprocating movement on the upper parts of the end frames. The adjustment of the upper parts of the frames with respect to the stationary bases allows the knives to be adjusted laterally toward and away from each other to get the proper slicing action between the two knives.

The upper knife 63 is secured at opposite ends to carriages 66 and 67 journaled for sliding movement on polygonal columns 68, one at each end frame and rotatably journaled at their ends in bearings 69 on the end frames. The upper end of the polygonal column carrying the carriage 66 is loosely received in its bearing so that vertical position of the column can be adjusted by adjusting the position of a brace 70 bolted to the end frame and having a bearing 70a thereon that closely journals the column at a place intermediate its ends. Supporting angles 71 extend across from the upper end of one end frame to the other and tie the end frames together. Bearings 72 are supported on the end frames and rotatably journal a drive shaft 73. The ends of the drive shaft carry bell cranks 74 provided at their outer ends with stud shafts 76 which are connected by pitmans 77 with stud shafts 78 extending from the carriages 66 and 67. Rotation of the drive shaft causes vertical reciprocating movement of the upper knife so that it coacts with the lower knife to sever the forward end of the mat of fibrous material.

The drive shaft is driven by means of a conventional gear head motor 81 supported on the angles 71 and having a driving pulley 82. The pulley is connected by V belts to a clutch pulley 83 of a clutch assembly 84 rotatably journaled on the drive shaft. The clutch assembly is provided with a roller clutch 85 of conventional kind arranged to permit over-running of the pulley 85 normally and to clutch the pulley to a sleeve 86 keyed to the shaft when the clutch is tripped. The clutch is a single rotation clutch of conventional type which normally is in unclutched relation. The clutch is tripped to bring the roller clutch into clutched engagement and connect the clutch pulley 83 to the drive shaft 73 by means of a lever 88 pivoted at its lower end to the frame. A second lever 89 is journaled at its upper end on the same pivot and has a lug 90 thereon arranged to engage a lug 91 carried by the hub of the lever 88. The lower end of the lever 89 is disposed to be engaged by a collar 92 on a rod 93 slidably mounted on the frame and connected to the piston 94 of an air cylinder 95.

As viewed in Figure 9, the piston 94 is normally at the left hand end of the cylinder 95 and is held there by air under pressure entering the cylinder through a line 96. When it is desired to operate the clutch and cause rotation of the shaft 73 and cutting movement of the knife, the air is exhausted through the line 96 and air under pressure is fed into the cylinder through a line 97 to force the piston to the left and thereby trip the clutch through actuation of the levers 88 and 89. In conventional manner the clutch makes one rotation and then automatically is shifted to unclutched position, in which position it remains until it is again tripped. After having tripped the clutch, the piston 94 is immediately returned to normal position at the left hand end of its cylinder, the lever 89 being moved idly by the collar 92 as the collar passes the lever.

The piston 94 and cylinder 95 are under control of a conventional rotary air valve 101 mounted on the end frame and having a sprocket and chain drive connection 102 with the shaft 103 of the lower roll of the pair 57 of rolls at the forward side of the end frames. By varying the relative size of the sprockets carried by the roll and the rotary valve, the length of travel of the fibrous mat between cutting operations of the knives may be varied to sever bats of desired size from the mat.

As previously pointed out, the paper backing 30 is severed only after a predetermined number of cuts of the fibrous mat, with the result that there is a number of bats all carried on a continuous backing sheet. To accomplish this, the carriage 66 at one of the end frames and that carries one end of the movable knife is arranged for lateral movement with respect to the stationary knife. For this purpose, in the present instance, the carriage is movable laterally on the polygonal column 68 upon which it slides. This is achieved by making the bearing in the carriage substantially larger in one dimension than the polygonal column so that the carriage can move relative to the column in directions that cause one end of the movable knife to move laterally toward and away from the stationary knife. The carriage 66 is held in forward position, where the knives are in closest lateral relation, by plungers 106 that engage one side of the polygonal column and are urged against the column by springs 107 seated at their other ends on adjustment screws 108. Three or more evenly spaced springs are carried by each carriage to exert even pressure over the vertical dimension of the carriage to hold the carriage snugly to the column.

The rear side of the carriage 66 carries a roller 111 which travels on a cam bar 112 pivoted at its lower end to the end frame and at its upper end being connected by a link 113 to the piston 114 of an air cylinder 116. As viewed in Figure 4, when the piston is at the left hand end of the air cylinder the cam bar through its roller connection with the carriage moves the carriage to the left with respect to the column 68 against the action of the springs on the carriage. In such relation of parts, the upper knife 63 is moved to the left so that when the knives come together vertically the cutting edge of the upper knife adjacent the carriage 66 is spaced a slight distance, say in the order of ½₂ to ⅟₁₆ inch, from the cutting edge of the stationary knife. When the knives are in this lateral relation, they cut the fibrous mat during vertical movement of the movable knife because of the considerable bulk of the mat but the thin flexible paper is only deflected from its path by the descent of the upper knife and is not cut, as shown in Figure 7. With this construction the end of the upper knife adjacent the carriage 66 is moved laterally away from the lower knife and the upper knife and the carriage 67 pivot about the axis of the polygonal column 68 at the other end frame. For ordinary purposes this gives sufficient clearance across the knives to prevent cutting of the paper. However, if desired, both carriages can be moved by duplicating the roller 111, cam bar 112 and piston and air cylinder 114, 116 at the other end frame to move the carriage 67 laterally along with the carriage 66.

After a number of cuts of the fibrous mat selected in a manner presently to be described, the piston 114 in the air cylinder 116 is moved to the right (Figures 4 and 8) which moves the cam bar to the right about its pivot and permits the springs on the carriage 66 to draw the carriage to the right and bring the left hand face of the column and the right hand face of the bearing in the carriage 66 into contact. In this relation of the parts, the cutting edges of the knives engage each other in a scissors action when the upper knife descends so that not only the fibrous mat but also the paper backing is severed.

It is to be pointed out that when the first bat of a series of bats is severed from the fibrous mat and the backing paper is drawn down over the knife as shown in Figure 7, the length of paper or slack needed for this deflection of the paper from its path is drawn rearwardly from beneath the first bat. Then as succeeding bats are severed from the oncoming mat but without severing the backing sheet, this slack in the backing paper is drawn backward stepwise along the series of bats until the paper is finally cut when the last bat of the series is severed.

The knives are placed into position for cutting the backing paper by compressed air fed into the cylinder 116 through a pipe 121, and the piston is moved in the opposite direction to draw the knives out of the relation in which they cut the backing paper by air forced into the cylinder through the pipe 122. These pipes 121 and 122 are connected to a four-way valve 124 operated by means of a solenoid 126. The arrangement is such that in one position of the valve the compressed air coming through a supply line 127 is directed into one end of the cylinder 116 through the pipe 122 and the pipe 121 is vented to the atmosphere, and in the other position of the valve the air from the pipe 127 is directed into the other end of the cylinder 116 through the pipe 121 and the pipe 122 is vented to the atmosphere.

The solenoid 126 is energized automatically after a selected number of bats have been cut from the mat. The means for controlling the solenoid comprises a stepping relay 141 of conventional type (Figure 10). The stepping relay operates a tap switch 142 in counterclockwise direction so that it makes contact consecutively with each of a number of taps (13 taps shown in the present instance). Each of the taps is connected with a corresponding tap on a selector switch 144 having a switch arm 146 that may be connected to any one of the taps.

A limit switch 147 mounted on the angles 71 is normally in the position shown in Figure 11 and is momentarily moved to its other position upon each rotation of the drive shaft 73 by cam 148 fixed to the shaft. Contacts 151 of the limit switch are normally closed and contacts 152 are normally open. As a result, relay solenoid 155 is normally energized and contactors 155a are open and contactors 155b and 155c are closed. When the limit switch is actuated by the cam 148, contactors 152 of the switch are closed and contactors 151 are opened momentarily. Upon opening of contactors 151, solenoid 155 is deenergized and contactors 155a are closed. This energizes solenoid coil 157 of the stepping relay 141 and in the ordinary fashion advances the tap switch 142 one tap. The switch arm 142 engages a spring-pressed ratchet 158 so that it is held in the positions to which it is moved by the solenoid 157. Consequently, each time the shaft 73 and the knives operate to sever the mat, the switch arm moves up one tap. When it reaches the tap that is connected to that tap of the selector switch engaged by the switch arm 146, a circuit is completed through the stepping relay switch, the selector switch and the solenoid 161. Energization of this solenoid closes contactors 161a, 161b, 161c and 161d. The contactors 161a seal in the solenoid 161. The closing of the contactors 161c and 161d energizes the solenoid 126 to set the valve 124 in the position where air is directed into the cylinder 116 through the pipe 121 and the piston 114 is moved to the right to correspondingly move the cam bar 112 and permit the knives to come into the position in which they sever the paper backing.

Also, upon energization of the solenoid 161 and closing of the contactors 161b, the solenoid 166 is energized. This solenoid draws the spring-pressed ratchet 158 away from the switch arm 142 to allow the switch arm to be returned to starting position by a spring 168 on the hub of the switch arm.

As the upper knife blade moves through the reciprocation in which the paper is severed, the limit switch 147 will, of course, be operated by the cam 148 on the drive shaft and would in normal fashion cause the stepping relay switch 142 to advance one tap. However, this particular advance of the switch is not desired because it does not correspond to the severing of the first bat on a continuous backing sheet. To nullify this advance, the solenoid 171 is energized momentarily by the closing of the contacts 152 of the limit switch 147 at the time the limit switch is operated by the drive shaft. The solenoid 171 closes contacts 171a (contactors 155b are momentarily open at this instant) to energize relay 166 to again withdraw the ratchet 158 and allow the switch arm 142 to be returned to starting position. At all other actuations of the limit switch 147 the closing of contactors 152 and energization of the solenoid 171 and closing of contactors 171a is idle because the contactors 161b are open at that instant.

The controlling mechanism just described is powered through a transformer 176 connected across the line 178 by a switch in the starter 179 for the motor 81.

The number of bats that may be severed before the backing paper is cut may be from 1 to 13 in the present embodiment, depending upon the position of the switch arm 146 of the selector switch 144. The length of the individual bats and therefore the total length of the series of bats having one piece of backing paper thereon depends upon the ratio between the sprockets on the rotary valve 101 and the lower roll of the pair 57 of rolls.

The apparatus herein disclosed is well adapted for performing the process of the invention and permits a great deal of flexibility in both the size of the bats and the number of bats on a single backing sheet, and consequently, provides the means of packaging insulating bats in an economical and efficient manner.

Various modifications may be made within the spirit of the invention and the scope of the claims.

We claim:
1. The process of making packaged fibrous bats which comprises, advancing in the general direction of its length a continuous fibrous mat having on one face thereof a continuous web of sheet material, cutting the mat transversely of the direction of travel of the mat into a plurality of bats but without severing the sheet material to form a series of individual bats overlying a continuous sheet, and concomitantly cutting the web of sheet material and the last bat of the series after a plurality of bats have been cut from the mat.

2. The process of making packaged insulating bats of fibers which comprises, advancing a continuous mat of fibrous insulation in the general direction of its length, continuously underlying the mat as it advances with a continuous web of paper, successively cutting the mat into a plurality of bats but without severing the paper web to form a series of individual bats overlying a continuous sheet of paper, and concomitantly cutting the last bat of the series and cutting the web of paper after a plurality of bats have been cut from the mat.

3. The process of making packaged fibrous insulating bats which comprises, advancing a continuous mat of fibrous insulation in the direction of its length, underlying the mat as it advances with a continuous web of paper, slitting the mat in the direction of travel of the paper into a plurality of strips, cutting the strips of mat transversely of the direction of travel of the mat into a plurality of bats but without severing the paper web to form a series of individual bats in end to end relation overlying a continuous sheet of paper, and concomitantly cutting the last transversely aligned bats of the series and cutting the web of paper after a plurality of bats have been cut from the mat.

4. The process of making packaged insulating bats which comprises, advancing a continuous mat of fibrous glass in the direction of its length, underlying the mat as it advances with a continuous web of kraft paper, slitting the mat and the paper web in the direction of travel of the mat into a plurality of strips, successively cutting the strips of mat transversely of the direction of travel of the mat into a plurality of bats but without severing the strip of paper web underlying each strip of mat to form a plurality of series of bats with each series of bats overlying a continuous sheet of paper, concomitantly cutting each web of paper and the last of the series of bats after a plurality of bats have been cut from the mat, and rolling each cut-off piece of paper web and the bats thereon into a roll.

5. Making packages of slab-like pieces which comprises cutting the articles from a mat-like body having a web of sheet material disposed over one face thereof, severing a series of slab-like pieces progressively from the end of the body without severing the web of sheet material, and concomitantly severing the web of sheet material and the last of the series of slab-like pieces after a predetermined number of slab-like pieces have been severed.

6. Apparatus for making packages of bats which comprises means for advancing a mat of material having a web of sheet material disposed over one face thereof, means for severing the forward end of the mat as it advances to cut the mat progressively into a series of individual bats, means for making the cutting means inoperative to cut the web of sheet material when the mat is severed to form the series of bats, and means making the cutting means operative to concomitantly cut the web of sheet material and the last of the series of bats from the mat after a selected number of cutting operations of the cutting means.

7. Apparatus for making packages of bats which comprises means for advancing a mat of material having a web of sheet material disposed over one face thereof, means for severing the forward end of the mat as it advances to cut the mat progressively into a series of individual bats, means for making the cutting means inoperative to cut the web of sheet material during a predetermined number of mat-cutting operations, means making the cutting means operative to concomitantly cut the web of sheet material and the last of the series of bats, and means for controlling said last-named means and responsive to a selected number of cutting operations of the cutting means.

8. Apparatus for making bat packages comprising, means for feeding onto one face of a mat a continuous web of sheet material, cutting means extending crosswise of the length of the mat for severing the mat transversely into bats, the cutting means being mounted so as to be movable into a plurality of positions, one of said positions causing the cutting means to sever the mat but not the web of sheet material and another position causing the cutting means to concomitantly sever both the mat and the web, and means for moving said cutting means into and out of the two said positions.

9. Apparatus for making insulating bat packages comprising, a conveyor for supporting and advancing a continuous mat of insulation, means for feeding onto one surface of the mat a continuous web of sheet material, a cutter movable through a path transverse of the path of the mat and in which it severs the mat but not said web, and movable through another path transverse of the path of the mat and in which it concomitantly severs both the mat and the web, and means for moving said cutter through one or the other of said paths.

10. Apparatus for making insulating bat packages comprising, a conveyor for supporting and advancing a continuous mat of insulation, means for feeding onto the conveyor to underlie the mat a continuous web of paper, a pair of knives extending crosswise of the path of travel of the mat and relatively movable transversely of the mat and coacting to sever the mat into bats, one knife of the pair being mounted at its ends on carriages that are slidable on supports in directions transversely of the mat to allow cutting movement of the knife, one of said carriages being movable with respect to its support in directions transversely of the cutting movement of the movable knife to vary the clearance between the knives when in cutting position, and means for moving said carriage relative to its support to move said movable knife into and out of the position in which the knives sever the web of paper.

11. Apparatus for making insulating bat packages comprising, a conveyor for supporting and advancing a continuous mat of insulation, means for feeding onto the conveyor to underlie the mat a continuous web of paper, a pair of knives extending crosswise of the path of travel of the mat for severing the mat transversely into bats, one knife of said pair being mounted in stationary position with its cutting edge substantially in the plane of the lower face of said mat and the other knife of the pair being movable toward and away from the stationary knife and co-acting with said knife to sever the mat, the movable knife being mounted at its ends on carriages that are slidable on supports in directions transversely of the mat to allow cutting movement of the knife, one of said carriages being movable with respect to its support in directions transversely of the cutting movement of the movable knife to vary the clearance between the knives when in cutting position, means for moving said carriage relative to its support to move said movable knife into and out of the position in which the knives sever the web of paper, and means for actuating said last-named means automatically operable after a number of operations of the knives.

References Cited in the file of this patent

UNITED STATES PATENTS

| 854,388 | Swift | May 21, 1907 |
| 1,677,915 | Crane | July 24, 1928 |
| 1,854,481 | Mudd | Apr. 19, 1932 |
| 2,538,972 | Magnani | Jan. 23, 1951 |

FOREIGN PATENTS

| 653,195 | Great Britain | May 9, 1951 |